US009454770B2

(12) United States Patent
Paulson (10) Patent No.: US 9,454,770 B2
(45) Date of Patent: *Sep. 27, 2016

(54) METHOD AND SYSTEM OF PUBLISHING CAMPAIGN DATA

(71) Applicant: eBay Inc., San Jose, CA (US)

(72) Inventor: Jedediah H. Paulson, San Mateo, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/543,661

(22) Filed: Nov. 17, 2014

(65) Prior Publication Data

US 2015/0073898 A1 Mar. 12, 2015

Related U.S. Application Data

(63) Continuation of application No. 11/583,563, filed on Oct. 19, 2006, now Pat. No. 8,892,756.

(51) Int. Cl.
| | |
|---|---|
| *G06F 15/16* | (2006.01) |
| *G06Q 30/02* | (2012.01) |
| *G06Q 50/18* | (2012.01) |
| *H04L 29/08* | (2006.01) |

(52) U.S. Cl.
CPC .......... *G06Q 30/0251* (2013.01); *G06Q 30/02* (2013.01); *G06Q 30/0207* (2013.01); *G06Q 30/0211* (2013.01); *G06Q 50/188* (2013.01); *H04L 67/02* (2013.01); *G06Q 30/0241* (2013.01); *G06Q 30/0272* (2013.01)

(58) Field of Classification Search
CPC ............. G06Q 30/0207; G06Q 30/02; G06Q 30/0241; G06Q 30/0251; H04L 67/02; H04L 67/26
See application file for complete search history.

(56) References Cited

U.S. PATENT DOCUMENTS

| | | | |
|---|---|---|---|
| 6,125,352 A | 9/2000 | Franklin et al. | |
| 6,405,175 B1 | 6/2002 | Ng | |
| 6,839,680 B1 | 1/2005 | Liu et al. | |
| 6,941,306 B2 | 9/2005 | Kim | |
| 7,032,014 B2 * | 4/2006 | Thiyagarajan | H04L 41/0869 709/220 |

(Continued)

OTHER PUBLICATIONS

"U.S. Appl. No. 11/583,563 Advisory Action mailed Apr. 8, 2011", 3 pgs.

(Continued)

*Primary Examiner* — Patrice Winder
*Assistant Examiner* — Nam Tran
(74) *Attorney, Agent, or Firm* — Schwegman, Lundberg & Woessner, P.A.

(57) ABSTRACT

One embodiment of the invention provides a method of publishing campaign metadata from a database to a plurality of channel systems, the method includes: querying the database to select campaign metadata ready for publishing to a target channel system; selecting the target channel system from a plurality of channel systems based on an target indicating attribute of the campaign metadata; determining whether the target channel system has a SOAP enabled webservice API or whether the target channel system only accepts HTTP posts; if the target channel system has a SOAP enabled webservice API, packaging the campaign metadata as an XML message object; if the target channel system only accepts HTTP posts, packaging the campaign metadata as an HTML request; and transferring the packaged campaign metadata to the target channel system.

14 Claims, 6 Drawing Sheets

(56) References Cited

U.S. PATENT DOCUMENTS

| | | | |
|---|---|---|---|
| 7,313,359 B2 | 12/2007 | Steelberg et al. | |
| 7,363,342 B1* | 4/2008 | Wang | H04L 67/02 709/204 |
| 7,587,415 B2* | 9/2009 | Gaurav | G06F 17/272 707/999.103 |
| 7,822,631 B1 | 10/2010 | Vander Mey et al. | |
| 8,103,540 B2 | 1/2012 | Gross | |
| 8,352,499 B2 | 1/2013 | Bharat et al. | |
| 8,412,557 B1 | 4/2013 | Lloyd et al. | |
| 8,892,756 B2 | 11/2014 | Paulson | |
| 2002/0049738 A1 | 4/2002 | Epstein | |
| 2002/0128908 A1* | 9/2002 | Levin | G06Q 30/02 705/14.53 |
| 2002/0138553 A1* | 9/2002 | Binder | H04L 67/02 709/203 |
| 2003/0014304 A1 | 1/2003 | Calvert et al. | |
| 2004/0268344 A1 | 12/2004 | Obilisetty | |
| 2007/0088603 A1 | 4/2007 | Jouppi et al. | |
| 2007/0101439 A1 | 5/2007 | Strauch et al. | |
| 2008/0097928 A1 | 4/2008 | Paulson | |
| 2009/0197582 A1 | 8/2009 | Lewis et al. | |
| 2010/0153196 A1 | 6/2010 | Paulson et al. | |

OTHER PUBLICATIONS

"U.S. Appl. No. 11/583,563, 312 Amendment filed Jul. 28, 2014", 7 pgs.

"U.S. Appl. No. 11/583,563, Final Office Action mailed Jan. 21, 2011", 26 pgs.

"U.S. Appl. No. 11/583,563, Final Office Action mailed Mar. 6, 2012", 25 pgs.

"U.S. Appl. No. 11/583,563, Non Final Office Action mailed Jan. 6, 2014", 26 pgs.

"U.S. Appl. No. 11/583,563, Non Final Office Action mailed Aug. 19, 2011", 24 pgs.

"U.S. Appl. No. 11/583,563, Non-Final Office Action mailed Jul. 22, 2010", 27 pgs.

"U.S. Appl. No. 11/583,563, Notice of Allowance mailed Jul. 8, 2014", 8 pgs.

"U.S. Appl. No. 11/583,563, PTO Response to Rule 312 Communication mailed Sep. 2, 2014", 2 pgs.

"U.S. Appl. No. 11/583,563, Response filed Mar. 21, 2011 to Final Office Action mailed Jan. 21, 2011", 11 pgs.

"U.S. Appl. No. 11/583,563, Response filed Apr. 9, 2014 to Non Final Office Action mailed Jan. 6, 2014", 10 pgs.

"U.S. Appl. No. 11/583,563, Response filed May 7, 2012 to Final Office Action mailed Mar. 6, 2012", 11 pgs.

"U.S. Appl. No. 11/583,563, Response filed Oct. 22, 2010 to Non Final Office Action mailed Jul. 22, 2010", 17 pgs.

"U.S. Appl. No. 11/583,563, Response filed Nov. 15, 2011 to Non Final Office Action mailed Aug. 19, 2011", 11 pgs.

"U.S. Appl. No. 12/617,562, Final Office Action mailed Jul. 19, 2012", 17 pgs.

"U.S. Appl. No. 12/617,562, Non Final Office Action mailed Sep. 24, 2014", 12 pgs.

"U.S. Appl. No. 12/617,562, Non Final Office Action Mailed Dec. 9, 2011", 16 pgs.

"U.S. Appl. No. 12/617,562, Response filed Mar. 9, 2012 to Non Final Office Action mailed Dec. 9, 2011", 14 pgs.

"U.S. Appl. No. 12/617,562, Response filed Oct. 19, 2012 to Final Office Action mailed Jul. 19, 2012", 11 pgs.

U.S. Appl. No. 12/617,562, filed Nov. 12, 2009, Enhanced Campaign Management Systems and Methods.

"U.S. Appl. No. 12/617,562, Final Office Action mailed May 22, 2015", 12 pgs.

"U.S. Appl. No. 12/617,562, Non Final Office Action mailed Nov. 9, 2015", 10 pgs.

"U.S. Appl. No. 12/617,562, Response filed Jan. 26, 2015 to Non Final Office Action mailed Sep. 24, 2014", 12 pgs.

"U.S. Appl. No. 12/617,562, Response filed Aug. 24, 2015 to Final Office Action mailed May 22, 2015", 11 pgs.

"U.S. Appl. No. 12/617,562, Notice of Allowance mailed Jun. 6, 2016", 5 pgs.

\* cited by examiner

| CAMPAIGN CODE | CAMPAIGN NAME | START DATE | END DATE | SITE | OBJECTIVE | INITIATIVE | TRACKING DURATION | PROGRAM TYPE | CHANNEL INDICATOR |
|---|---|---|---|---|---|---|---|---|---|
| 1001 | US_ToysMonthlyBuyer_08162006_JP | 8162006 | 8162006 | US | INCREASE PURCHASE IN TOYS CATEGORY | BUYER ACTIVITY | 7 DAYS | BUYER MERCHANDISING | KCI |

FIG. 3

| OFFER CODE | NAME | DESCRIPTION | START DATE | END DATE | VALUE | CONTACT CHANNEL |
|---|---|---|---|---|---|---|
| 2000001 | US_ToysNewHotItem_08162006_JP | NEW OFFER FOR THE HOTTEST TOY ON eBAY | 8162006 | 8232006 | $0 | EMAIL |
| 2000002 | ApparelNewHotItem_08162006_JP | NEW OFFER FOR THE HOTTEST APPAREL ON eBAY | 8162006 | 8232006 | $0 | EMAIL |
| 2000003 | US_ToysNewHotItem_08162006_JP | NEW OFFER FOR THE HOTTEST APPAREL ON eBAY | 8162006 | 8232006 | $0 | POSTAL |

UAC CONTACT HISTORY

| USER_ID | TRACKING_CD | RUN_DT | OFFER_CD |
|---|---|---|---|
| 80000001 | T0001-00 | 2006-08-28 | 10001 |
| 80000002 | B0002-00 | 2006-08-29 | 10002 |

FIG. 4

User Information

| user_id | user_selected_id | user_status_code | user_country_code | user_feedback_score | user_paypal_id |
|---|---|---|---|---|---|
| 10122334 | jammasterjed | active | usa | 23 | payjedpal |
| 10122335 | bigauctionman | suspended | germany | 45 | bigpaytime |
| 20344556 | tomselectrons | active | uk | 1003 | 999 |

METHOD AND SYSTEM OF PUBLISHING CAMPAIGN DATA

PRIORITY

This application is a continuation of and claims the benefit of priority under to U.S. patent application Ser. No. 11/583,563, filed on Oct. 19, 2006, which is hereby incorporated by reference herein in its entirety.

TECHNICAL FIELD

The present application relates generally to the technical field of data publishing, and more particularly, to systems for publishing marketing campaign data from a database to campaign distribution systems.

BACKGROUND

With the development of network technologies, business users may use networks and communication links to carry marketing campaigns to prospective customers.

Campaign generation systems allow business users to create, edit and save or store campaign metadata. Channel systems such as, for example, email, direct mail, website advertising placements, website email, and outbound call systems are normally used by business users to distribute campaign information to potential customers. The channel systems can be owned and managed by different facilities.

Current campaign generation systems may have insufficient integration capabilities to send both campaign user lists and campaign information, which often includes offer metadata to downstream channel systems or content editing systems. Because of this, a business user may have to create campaign related information in the campaign generation system, and then login to the downstream systems, recreate the campaign related information, and then trigger the distribution of the campaigns to the targeted customers. Improved systems would eliminate duplicate data entry, prevent data errors, increase productivity of business users and shorten delays in campaign delivery to target customers.

BRIEF DESCRIPTION OF THE DRAWINGS

Some embodiments are illustrated by way of example and not limitation in the figures of the accompanying drawings in which.

DETAILED DESCRIPTION

Example methods and systems to publish campaign and related user lists to potential customers are described. In the following description, for purposes of explanation, numerous specific details are set forth in order to provide a thorough understanding of example embodiments. It will be evident, however, to one skilled in the art that the embodiments of the invention may be practiced without these specific details.

Embodiments of the invention can publish campaign related metadata created by marketer business users to potential customers. As used herein, "campaign information" is marketing material sent to segmented customers with the goal of influencing the segmented customers' behavior, e.g. attracting the segmented customers to buy a manufacturer's specific products. As used herein, "metadata" is data that defines other data. As used herein, "user lists" are lists that uniquely identify customers targeted for marketing campaigns.

The embodiments of the invention can determine how to package the campaign metadata based on the configurations and requirements of the target channel systems. Embodiments of the invention can also be used to validate the user lists which will be sent to potential customers.

Figure 1:
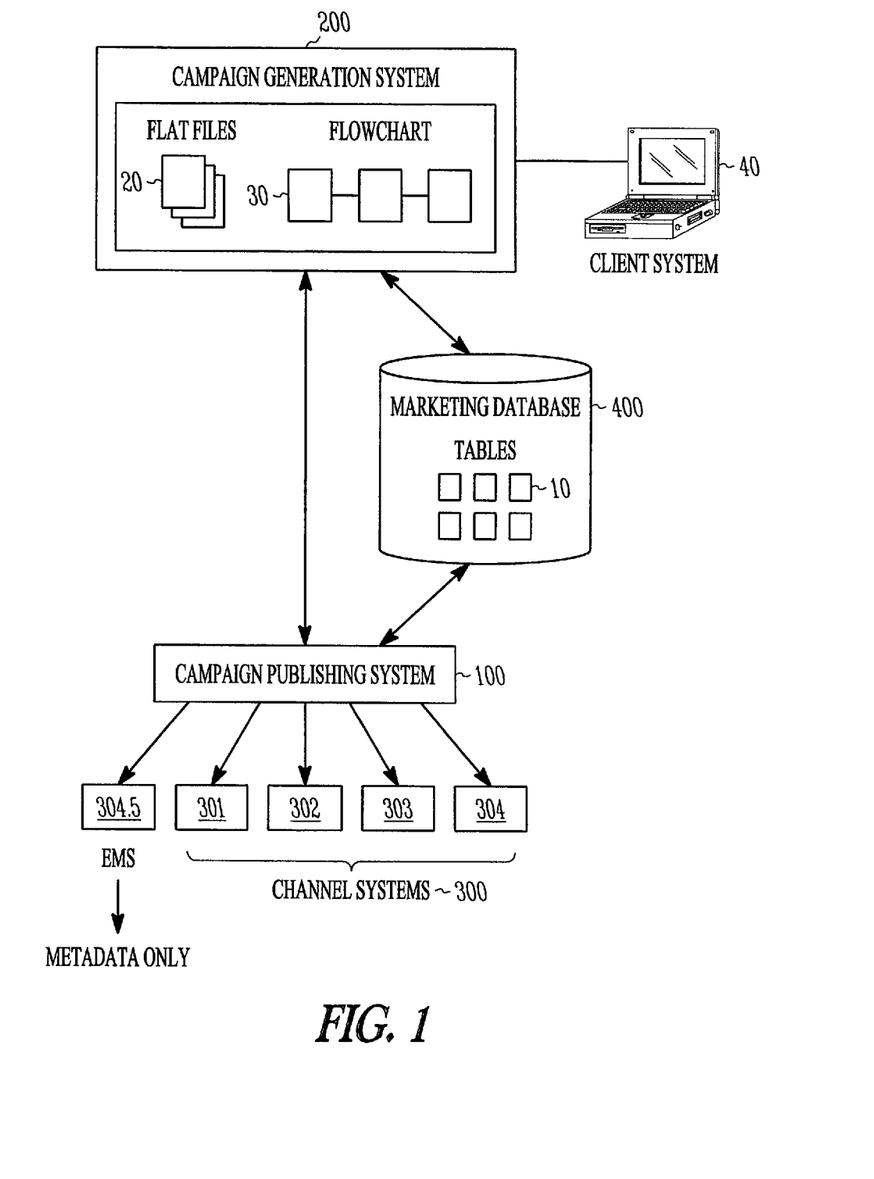
FIG. 1 is an overview block diagram illustrating a context of a campaign publishing system in accordance with an embodiment.

FIG. 1 is an overview block diagram illustrating the context of a campaign publishing system 100 in accordance with an example embodiment of the invention.

In an embodiment, the campaign publishing system 100 communicates over direct connections or networked connections to a campaign generation system 200 and several channel systems 300. While embodiments of the present invention are described within the context of the campaign generation system 200 and several content editing systems and channel systems 300, it will be appreciated by those skilled in the art that embodiments of the invention include many different types of campaign generation systems, channel systems, and content management systems.

In some embodiments, the campaign generation system 200 is a system, which is available in the market, for example, "Unica Affinium Campaign" of Unica Co. Channel systems 300 are systems for distribution of email and direct mail, eBay website advertising placement on eBay.com, and eBay MyMessages on eBay.com, which may be available in the market or have been custom built by eBay.com. In an embodiment, the channel system 300 is a CRM (Customer Relationship Management) system used to track and manage inbound and outbound phone calls, which is a product of SaleForce.com. In another embodiment, the channel system 300 is a CRM system used to track and manage inbound and outbound phone calls, e.g. Siebel CRM and Oracle CRM.

In an embodiment, the campaign publishing system 100 may access a database 400 as shown in FIG. 1. The campaign publishing system 100 reads from and writes to the database 400, which includes tables 10. The campaign publishing system 100 also creates and writes to flat files 20. In some embodiments, flat files 20 are stored in the campaign generation system 200. In some other embodiments, flat files 20 are stored in the database 400. Tables 10 are used to store metadata of a marketing campaign, for example, offer details, user information, and user campaign contact history. A flat file 20 is used to store customer data, e.g. potential target customer information for a marketing campaign.

Preparation for Publishing Campaign Metadata and Related User Lists

Before publishing the campaign metadata and user lists to a plurality of systems via the campaign publishing system 100, a campaign marketer may prepare marketing campaign related data by utilizing a campaign generation system 200. The campaign marketer may log into the campaign generation system 200 through a client computer 40, which communicates with the campaign generation system 200 through networks (not shown). For example, the campaign marketer may enter, update, and save campaign and offer metadata to relevant tables 10 in the database 400.

For instance, assume that a campaign marketer wants to create a new marketing campaign, which is to be sent to all eBay customers who have purchased a toy on eBay.com in the last 3 months. The marketing campaign is to be sent through an eBay channel system, for example, one which is responsible for sending email campaigns to eBay customers. In some embodiments, the marketing campaign is also intended to be sent to an external company responsible for sending postal direct mail campaigns to eBay customers. In some embodiments, the campaign is to be sent to customer support systems for use in outbound telephone calls to eBay customers. In some embodiments, the campaign is to be displayed as marketing advertisements to targeted customers on eBay.com.

The campaign marketer may create a new campaign by using a campaign creation page in the campaign generation system 200, and then save the campaign in a campaign table 10. After the creation of the metadata for the campaign, in some circumstances, the campaign marketer may update it by changing the status of a campaign from "New" to "Ready to Publish" and saving the campaign.

Figure 2:
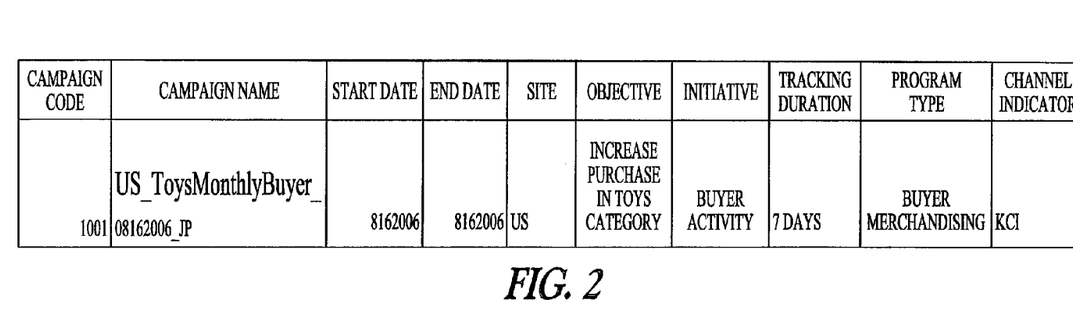
FIG. 2 illustrates a data structure of a campaign table in accordance with an embodiment.

FIG. 2 illustrates the data structure of a campaign table in accordance with an embodiment. For instance, the campaign marketer may enter the attributes, i.e. campaign metadata for a campaign, as illustrated in FIG. 2. The unique campaign code of the campaign is automatically created by the campaign generation system 200.

Figure 3:
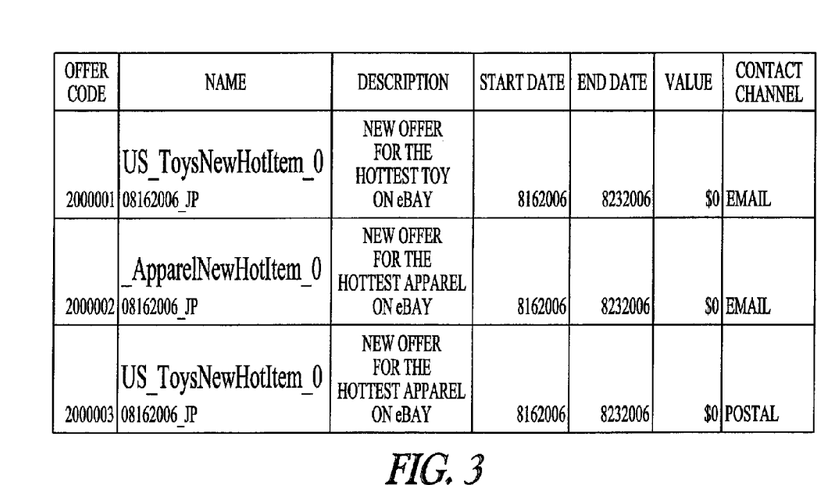
FIG. 3 illustrates a data structure of an offer table in accordance with an embodiment.

FIG. 3 illustrates the data structure of an offer table in accordance with an embodiment. For instance, the campaign marketer may create new offers by using an offer creation page in the campaign generation system 200, and then save the offers in an offer table 10. The unique Offer Code of each offer metadata is created automatically by the campaign generation system 200.

Figure 4:
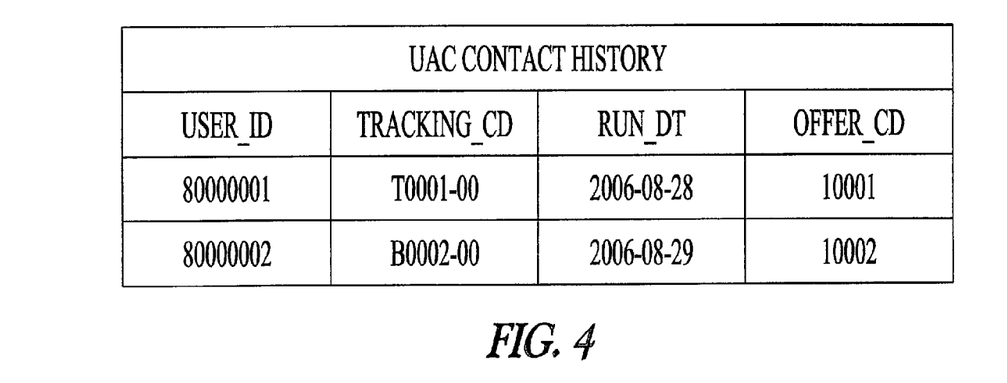
FIG. 4 illustrates data a structure of a user contact history table in accordance with an embodiment.

FIG. 4 illustrates the data structure of a user campaign contact history table in accordance with an embodiment.

Figure 5:
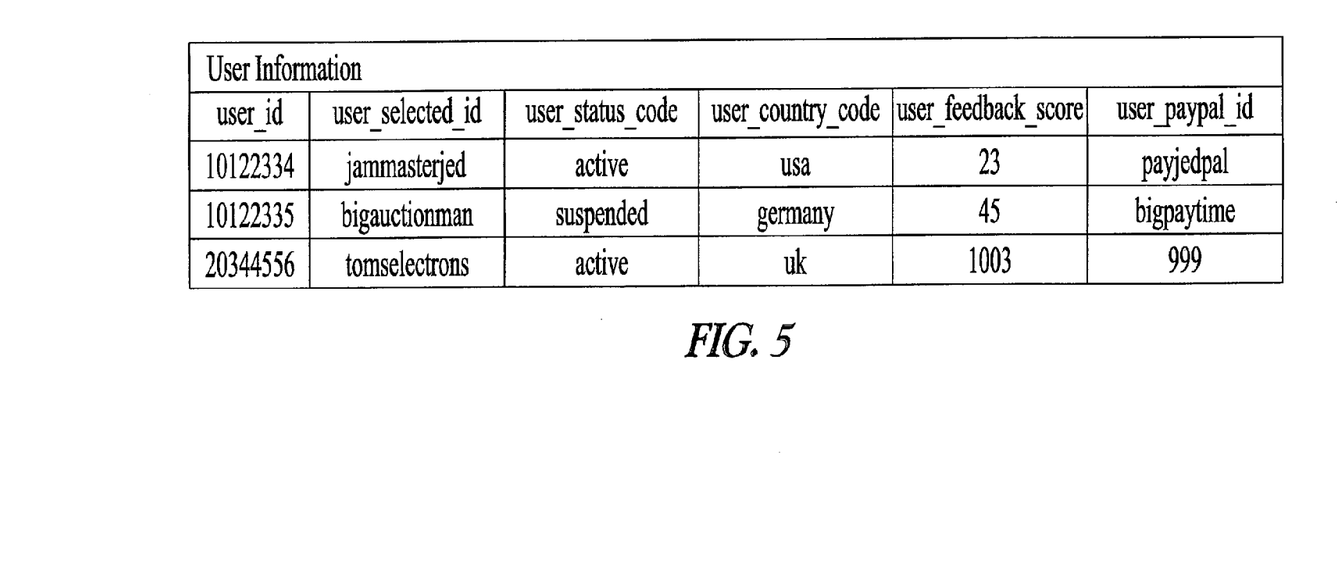
FIG. 5 illustrates data a structure of a user information table in accordance with an embodiment.

FIG. 5 illustrates data a structure of a user information table in accordance with an embodiment.

In some embodiments, the campaign marketer may use the campaign generation system 200 to create and save a flowchart 30 in the campaign generation system 200. A flowchart 30 corresponds to a query or series of consecutive queries to the database 400, which can be performed by using conventional DBMS skills to meet certain business requirements. For example, in some embodiments, the campaign marketer may choose to build a flowchart 30 which contains a query to the user information table. In some embodiments, the campaign marketer may select all buyers who have opted out of email communications. The campaign marketer may merge the two selects together, so the resulting output is the intersect of all toys buyers minus all who have opted out. After that, the campaign marketer may feed this result into a sample box, which will allow for segmenting and uniquely tracking members of a "holdout" population who are eligible but will not be sent the communication in order for the business to calculate changes in customer behavior due to a campaign.

In some embodiments, the campaign generation system 200 may allow a campaign marketer to create user lists and to merge different customer segments (e.g. all customers who bought in the Toys category on eBay with all customers who live in California) as well as exclude segments (e.g. remove all customers who bought in the Apparel category) to generate a final list of customers and their email addresses. The user list can be the output of the campaign generation system 200.

Figure 6:
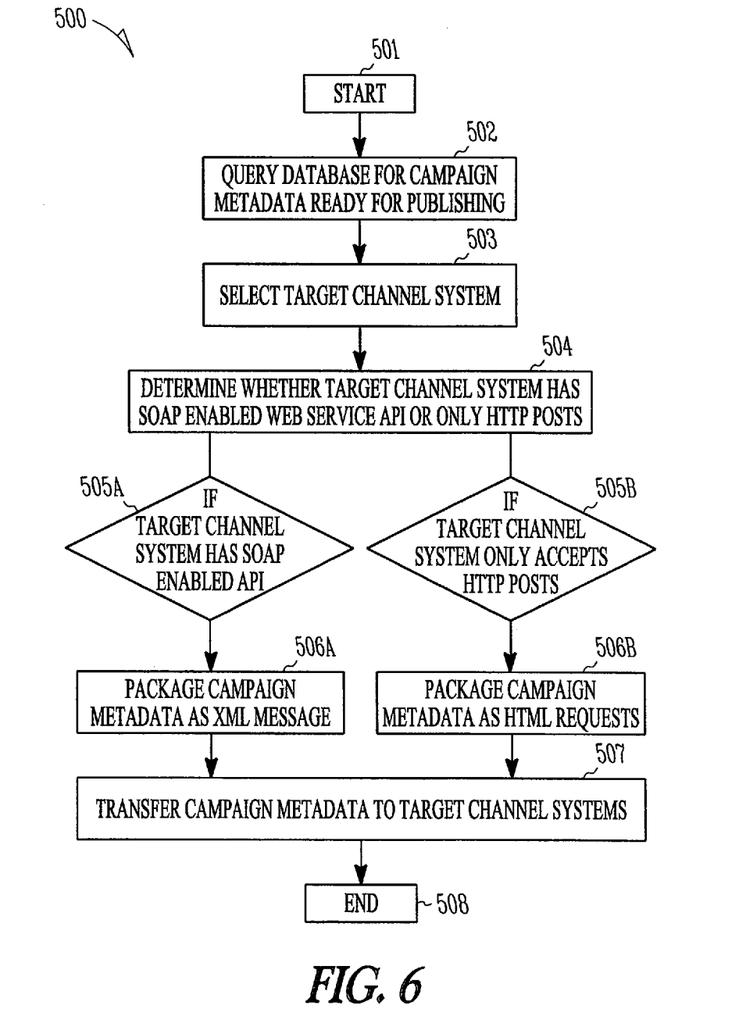
FIG. 6 is a flowchart illustrating a method of publishing campaign metadata of a campaign from a database to a plurality of channel and content editing systems in accordance with an embodiment.

FIG. 6 illustrates a method 500 of publishing campaign metadata of a campaign from database 400 to a plurality of channel systems 300 in accordance with an embodiment.

In an embodiment, at 501, the method 500 initiates the process of publishing campaign metadata. In an embodiment, for all campaigns, the campaign marketer initiates the process of publishing campaign metadata by saving a campaign with an attribute of "ready to publish". The campaign is saved in the database 400 and the campaign generation system 200. In an embodiment, a campaign flowchart 30 is saved in the campaign generation system 200.

In an embodiment, a campaign flowchart 30 is run once from the campaign generation system 200. In another embodiment, an external system calls the campaign generation system 200 by using an exposed API of the campaign generation system 200 to run the campaign flowchart 30. In an embodiment, the call is done daily for a campaign, for example, "Welcome new eBay users" campaign, which is sent to all newly registered users each night.

In an embodiment, metadata is published by saving the campaign and setting the channel attribute (e.g. email, mail, phone) to "ready to publish". The publishing is only done once per campaign, unless it is intended to update metadata, e.g. to change the end date of the campaign.

At 502, the campaign publishing system 100 queries a campaign table 10 in the database 400 to select campaign metadata with status "ready to publish". Each campaign metadata includes a channel indicator attribute to indicate a target channel system 300, thus the campaign publishing system 100 knows to which one of the channel systems 300 to publish the selected campaign metadata.

At 503, the campaign publishing system 100 selects a target channel system 300 from a plurality of channel systems 300 based on the target indicator attribute of the campaign metadata.

At 504, the campaign publishing system 100 determines whether the target channel system 300 has a SOAP (Simple Object Access Protocol) enabled webservice API (Application Programming Interface) or whether the target channel system 300 only accepts HTTP (Hypertext Transfer Protocol) posts.

At 505*a*, if the campaign publishing system 100 determines that the target channel system 300 has a SOAP enabled webservice API, then at 506*a* the campaign publishing system 100 packages the campaign metadata as an XML message object. "XML" is Extensible Markup Language.

Otherwise, at 505*b*, if the campaign publishing system 100 determines that the target channel system 300 only accepts HTTP posts, then at 506*b* the campaign publishing system 100 packages the campaign metadata as an HTML request. "HTML" is Hypertext Markup Language.

At 507, the campaign publishing system 100 transfers all the packaged campaign metadata to the target channel systems 300. In some embodiments, the campaign publishing system 100 transfers the XML message object to the target channel system 300 using SOAP over HTTP protocol. In some embodiments, the campaign publishing system 100 transfers the HTML request to the target channel system 300 over HTTP protocol.

At 508, the process of publishing the campaign metadata stops.

In an embodiment, after 502, the campaign publishing system 100 aggregates one or more offers and corresponding metadata to the selected campaign and campaign metadata. In an embodiment, the campaign publishing system 100 handles system errors of each step by sending email alerts to a support team and logging system errors to log files.

In an embodiment, after the campaign metadata has been transferred successfully, the campaign publishing system 100 updates the status of all the transferred campaign metadata in the database 400 to "successful" to identify that such campaign metadata has been transferred successfully.

Figure 7:
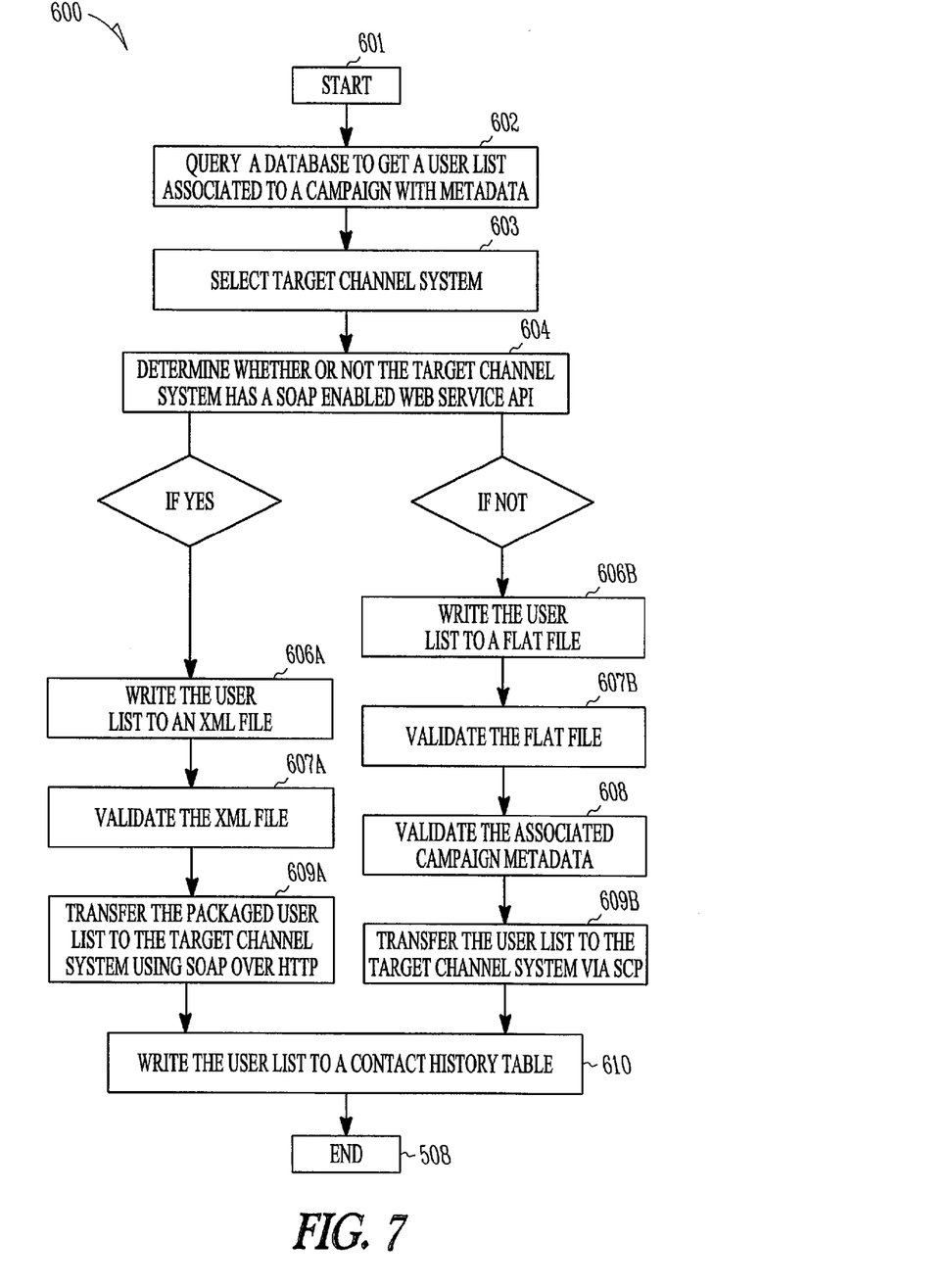
FIG. 7 is a flowchart illustrating a method of publishing a user list for a marketing campaign from a database to a plurality of channel systems in accordance with an embodiment.

FIG. 7 illustrates a method 600 of publishing a user list for a marketing campaign from a database 400 to a plurality of channel systems 300 in accordance with an embodiment of the invention.

In an embodiment, for a one-time campaign sent only once to customers, at 601, the campaign marketer initiates the process of publishing user lists for a marketing campaign by running a flowchart 30. In some embodiments, the flowchart 30 is saved in the campaign publishing system 100. In other embodiments, the flowchart 30 is saved in the database 400.

In another embodiment, at 601, for a recurring campaign, the process of publishing user lists for a marketing campaign is initiated by a cron job in a constant period of time, e.g. weekly, daily, or every 5 minutes. In an embodiment, the cron job is located within campaign publishing system 100. In another embodiment, the cron job is located in an external system, e.g. campaign generation system 200.

At 602, the campaign publishing system 100 queries the database 400 to obtain user lists of customer data meeting certain business requirements. In an embodiment, the user list obtained is associated to a campaign which has campaign metadata. The campaign metadata includes a channel indicator attribute, e.g. "KC1" to indicate a target channel system 300, accordingly the campaign publishing system 100 uses this channel indicator attribute to identify which of the channel systems 300 to publish a selected user list.

At 603, the campaign publishing system 100 selects a target channel system 300 based on the channel indicator attribute included in the campaign metadata.

At 604, the campaign publishing system 100 uses internal configuration properties to determine whether or not the target channel system 300 has a SOAP enabled webservice API.

If it is SOAP enabled, the campaign publishing system 100 writes the user list to an XML file 20 at 606a, validates the XML file 20 at 607a, and transfers the packaged user list to the target channel system 300 at 609a using SOAP over HTTP protocol.

If it is not SOAP enabled, the campaign publishing system 100 writes the user list to a flat file 20 at 606b, validates the flat file 20 at 607b, validates the associated campaign metadata at 608, and transfers the user list to the target channel system 300 by copying the flat file 20 to the target channel system 300 via SCP at 609a. "SCP" is Secure Copying Protocol.

At 607a and 607b mentioned above, the campaign publishing system 100 validates the XML file and the flat file 20. In some embodiments, the publishing process will be aborted and an email alert will be sent to a system administrator, if the campaign publishing system 100 finds any of the following cases exists: (1) The XML file or flat file 20 is empty; (2) The XML file or flat file 20 does not contain all required fields for the targeted channel system; and (3) Any of the required fields in the XML file or flat file 20 is not in valid format. For example, no spaces or invalid characters exist in the following fields of the XML file or flat file 20: email address, address (city, state, address1, and address2), offer version, Segment_ID. In an embodiment, if any of the invalidations in the XML file or flat file 20 is found, the campaign publishing system 100 will stop the publishing process and will send errors to an administrator.

In an embodiment, at 609b mentioned above, the campaign publishing system 100 validates if the metadata of the flat file 20 matches the metadata of the associated campaign which has been successfully published to the target channel system 300. If they do not match, in an embodiment, the campaign publishing system 100 will send errors to an administrator.

At 610, after transferring the user list to the target channel system 300, the campaign publishing system 100 writes the user list to a contact history table. In some embodiments, the contact history table is saved in the marketing database 400 for reporting and for customer suppression in subsequent marketing campaigns.

At 611, the process of publishing the user lists to the target channel system stops.

Figure 8:
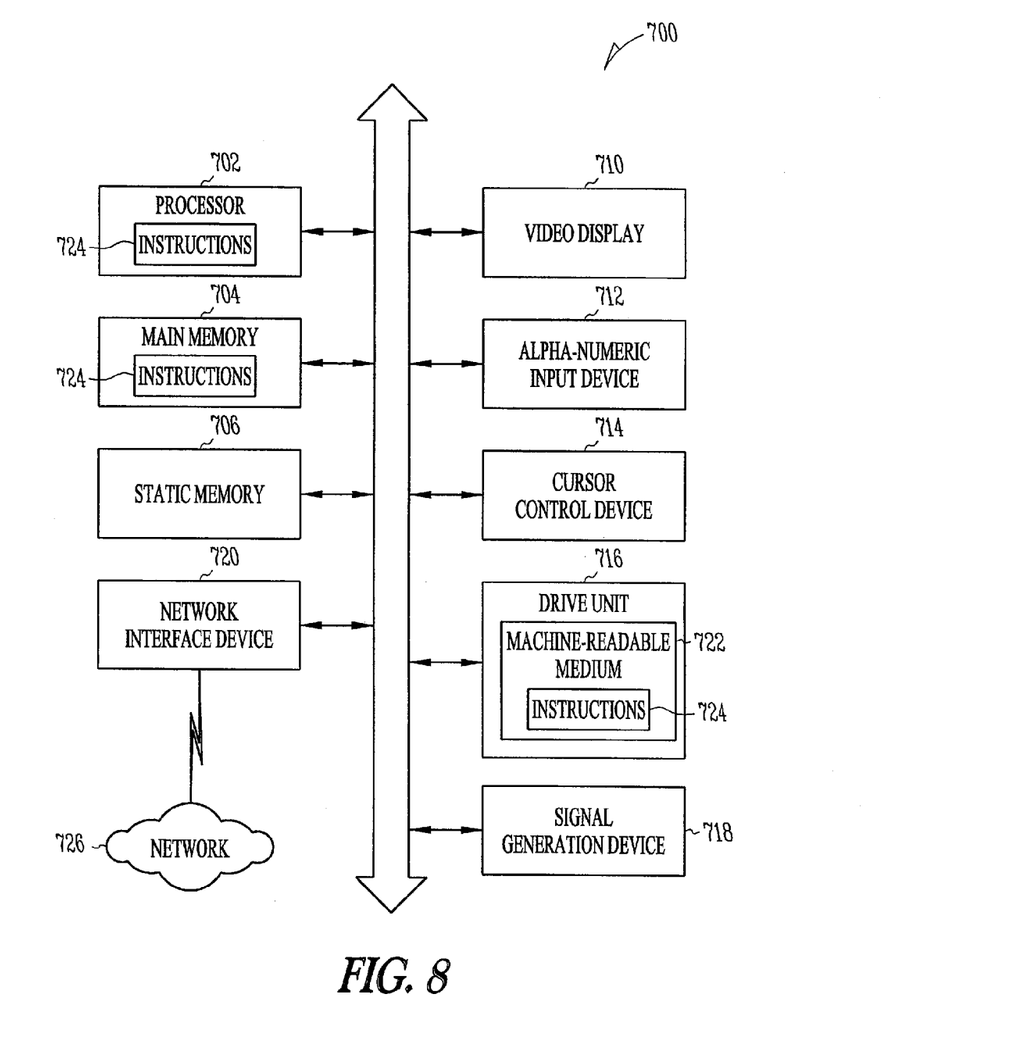
FIG. 8 is a block diagram illustrating a machine in the example form of a computer system, within which a set of sequence of instructions for causing the machine to perform any one of the methodologies discussed herein may be executed.

FIG. 8 is a block diagram illustrating a machine in the example form of a computer system 700, within which a set of sequence of instructions for causing the machine to perform any one of the methodologies discussed herein may be executed. In alternative embodiments, the machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions that specify actions to be taken by that machine. Further, while only a single machine is illustrated, the term "machine" shall also be taken to include any collection of machines that individually or jointly execute a set of instructions to perform any one or more of the methodologies discussed herein.

The example computer system 700 includes a processor 702 (e.g., a central processing unit (CPU) a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Below is a specific example to illustrate how to use an embodiment of the campaign publishing system 100 to publish a marketing campaign to potential customers.

A campaign marketer logs in to the campaign generation system 200, navigates to a campaign created earlier, opens the campaign flowchart and selects "Edit". Then, the marketer edits the flowchart. For example, the campaign marketer builds customer segments via a query to the user_information table according to the business requirements for certain marketing purposes. The campaign marketer also selects all buyers who have opted out of email communication. The campaign marketer merges the two selects together, so the resulting output is intersects of all ebay.com toys buyers minus all opt outs. The campaign marketer feeds this result into a sample box, which allows the marketer to segment out a holdout population. The holdout population is a group of customers who are selectively removed from the campaign in order for eBay to evaluate the effectiveness of the campaign, e.g. the amount of purchases by customers who were eligible and did receive the campaign versus the amount of purchases by customers that were eligible but did not receive campaign. The campaign marketer selects two mail list boxes and in the first, named "email output", assigns the previously created email offers to the Toys customer segment. The campaign marketer uses the second titled "postal output", and assigns the postal offer to the same segment of Toys customers. The campaign marketer uses a third mail list box to represent the "hold out" segment, and assigns the Holdout offer to the holdout segment.

At this point the flowchart 30 is built, and when run, will query the database for the customer segment according to requirements. The flowchart 30 will assign offers to resulting segments, output the segments to the contact history table, and create flat files 20 for the email and direct mail user lists. The campaign marketer saves the flowchart 30 and returns to the campaign summary page. On the campaign summary page, the campaign marketer changes the EMS (eBay Marketing System) Publish Trigger from "New" to "Ready for Publish" and saves the campaign. This updates the data from "New" to "Ready" in a table, which can be used to trigger to publish a campaign, for example, the table UAC_CAMPAIGN.EMS_PUBLISH_TRIGGER.

The campaign publishing system 100 is called every 5 minutes by a "cron job" process. The process calls the campaign publishing system 100 which queries the database and reads from the UAC_CAMPAIGN.EMS_PUBLISH_TRIGGER field for all records that are "Ready", (campaigns in a status of "Ready for Publish"). In this case, it will find the above campaign in a status of "ready", and campaign publishing system 100 will follow logic specific to an eBay Marketing System, in order to build the related Campaign and Offer metadata and send using XML over SOAP to the external EMS system. The campaign marketer is able to see the transfer was successful by refreshing their browser on the campaign summary page. If successful, campaign publishing system 100 will write a status message to a field of a table (for example, UAC_CAMPAIGN), which is read by a campaign generation system 200 and displayed on the campaign summary page in the EMS success message field, for example "EMS Transfer Successful".

EMS is used for email content creation, and an EMS user updates a Program created by the campaign metadata sent over from campaign publishing system 100. For example, the Program name will be created with Campaign Name, the start date and end date will be as indicated in the campaign metadata. In addition, the Offers sent from campaign publishing system 100 will appear as codes which can be appended to the URLs within the campaign content. Using the descriptive Offer Names, the EMS user knows to assign the US_ToysNewHotItem_08162006_JP offer code to the links specific to the Toy's Content or image. Same for the Apparel content or image. The EMS user will finalize the email content, save and send to the Email channel systems using FTP (File Transfer Protocol) for subsequent launch.

Now that the content is ready, all pre-steps have been completed the user can transfer the campaign metadata to the email and postal channel and run the campaign (e.g. run the flowchart 30). The user will login to the campaign generation system 200 and navigate to the US_ToysMonthlyBuyer_08162006_JP campaign and select edit. On the campaign summary page, the user will change the value of Kana Publish Trigger from "New" to "Ready to Publish" and select Save. This will change a corresponding value in the field from New to Ready.

A "cron job" is constantly running, calling the campaign publishing system 100 to scan the UAC_CAMPAIGN.Kana_Publish_trigger table for all Kana_publish_trigger="ready". If found, the campaign publishing system 100 will query for all related metadata and package the corresponding xml for the channel. In this case, channel is "KC1" (eBay.com has three email systems: KC1, KC2, KC3). The campaign publishing system 100 will initiate a Web Service call passing the metadata as well formed XML to the email system's Web Service API. The user is able to see the transfer was successful by refreshing their browser on the campaign summary page. If successful, the campaign publishing system 100 will write a status message to the UAC_CAMPAIGN.KANA_SUCCESS_MESSAGE field which is read by campaign generation system 200 and displayed on the campaign summary page in the Kana Success Message Field, for example "Kana Successful Transfer".

The campaign marketer user can then navigate to the campaign flowchart and select "Run". This will cause the campaign generation system 200 to run the flowchart 30, which executes the pre-built queries against the database tables, pulls the matching users, and writes the user list to a flat file for Email and a different flat file for Postal as well as to the UAC_CONTACT_HISTORY table. Upon completion, the campaign generation system 200 will make a call to the channel publishing system 100 to do two things. First, validate the content of the flat files meets business requirements. Second, transfer the validated flat files to the corresponding channel systems.

The campaign publishing system 100 performs validation on both flat files 20, making sure that the flat files 20 are not empty, there are no abnormal characters in the fields, the flat files 20 are delimited correctly, and the metadata in the flat files 20 matches the metadata associated to the campaign. If all these checks pass, the flat files 20 are transferred using Secure Copy Protocol (SCP) from the server of campaign publishing system 100 to the KC1 email server and to the Postal server, respectfully.

At this point, the user may navigate to the email system 300, find the corresponding campaign, associate the finished campaign content sent earlier from EMS, and launch the campaign. This causes the email system to send out email content to all customers on the campaign user list. Concurrently, an external postal catalog publisher may take the campaign publishing system postal flat file and use the corresponding customer name and addresses in this file for an eBay Catalog. The content of the catalog may be provided by a external vendor, and the postal catalog publisher will use their processes to associate customer name and address to catalog and send via postal mail. Thus, the campaign will be published to the potential customers.

Thus, a method and a system to publish campaign metadata related to marketing campaigns and customer user lists to channel systems 300 has been described. Although the present invention has been described with reference to specific embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A network-based system, comprising:
a database to store campaign metadata which has an attribute indicating a target channel system from a plurality of target channel systems, the campaign metadata comprising a user list associated with a campaign; and
a campaign module including at least one processor and configured to:
query the database to select the campaign metadata;
determine whether the target channel system includes a protocol specification for exchanging structured information in a webservice API or that the target channel system only accepts HTTP requests;
package the campaign metadata as structured information according to the protocol specification based on determining that the target channel system includes a protocol specification for exchanging structured information in a webservice API;
package the campaign metadata as an HTTP "post" request based on determining that the target channel only accepts HTTP requests;
validate the packaged user list; and
transfer the packaged campaign metadata to the target channel system.

2. The system of claim 1, wherein the campaign module is further configured to:
after querying the database, aggregate one or more offer metadata with the selected campaign metadata; and
after transferring campaign metadata successfully, update the status of transferred campaign metadata in the database to identify that the campaign metadata has been transferred successfully.

3. The system of claim 1, wherein the campaign module is further configured to:
based on determining that the target channel system only accepts HTTP requests, writing the user list to a flat file;
validate the flat file; and
transfer the user list by copying the flat file to the target channel system.

4. The system of claim 3, wherein validating the flat file comprises, if finding that the flat file does not contain a required field for the targeted channel system, aborting the publishing process and sending an email alert to a system administrator.

5. The system of claim 3, wherein validating the metadata of the associated campaign comprises, if finding that metadata of the flat file and the metadata of the associated campaign do not match, aborting the publishing process and sending an email alert to a system administrator.

6. A method, comprising:
querying, by a computerized campaign system, a database to select campaign metadata ready for publishing to a target channel system, the campaign metadata comprising a user list associated with a campaign;
selecting, by the campaign system, the target channel system from a plurality of target channel systems based on a target indicating attribute of the campaign metadata;
determining, by the campaign system, whether the target channel system includes a protocol specification for exchanging structured information in a webservice Application Program Interface (API) or that the target channel system only accepts HTTP requests;
based on determining that the target channel system includes a protocol specification for exchanging structured information in a webservice API, packaging, by the campaign system, the campaign metadata as structured information according to the protocol specification;
based on determining that the target channel system only accepts HTTP requests, packaging, by the campaign system, the campaign metadata as an HTTP "post" request
validating the packaged user list; and
transferring, by the campaign system, the packaged campaign metadata to the target channel system.

7. The method of claim 6, further comprising, after querying the database, aggregating one or more offer metadata with the selected campaign metadata, and after transferring campaign metadata successfully, updating the status of transferred campaign metadata in the database to identify that the campaign metadata has been transferred successfully.

8. The method of claim 6, further comprising:
based on determining by the campaign system that the target channel system only accepts HTTP requests, writing the user list to a flat file;
validating the flat file; and
transferring the user list by copying the flat file to the target channel system by the campaign system.

9. The method of claim 8, wherein validating the flat file comprises, if finding that the flat file does not contain a required field for the targeted channel system, aborting the publishing process and sending an email alert to a system administrator.

10. The method of claim 8, wherein validating the metadata of the associated campaign comprises, if finding that metadata of the flat file and the metadata of the associated campaign do not match, aborting the publishing process and sending an email alert to a system administrator.

11. A non-transitory computer-readable medium including instructions that, when performed by a computer in a campaign publishing system, cause the system to:
- query a database to select all campaign metadata ready for publishing to a target channel system, the campaign metadata comprising a user list associated with a campaign;
- select the target channel system from a plurality of target channel systems based on a target indicating attribute of the campaign metadata;
- determine that the target channel system includes a protocol specification for exchanging structured information in a webservice API or that the target channel system only accepts HTTP requests;
- based on determining that the target channel system includes a protocol specification for exchanging structured information in a webservice API, package the campaign metadata as structured information according to the protocol specification;
- based on determining that the target channel system only accepts HTTP requests, packaging, by the campaign system, the campaign metadata as an HTTP "post" request;
- validate the campaign metadata; and
- transfer the packaged campaign metadata to the target channel system.

12. The non-transitory computer-readable medium of claim 11, further comprising instructions that cause the machine to:
- based on determining that the target channel system only accepts HTTP requests, write the user list to a flat file;
- validate the flat file; and
- transfer the user list by copying the flat file to the target channel system.

13. The non-transitory computer-readable medium of claim 12, further comprising instructions that cause the machine to, when validating the flat file, if finding that the flat file is empty, abort the publishing process and send an email alert to a system administrator.

14. The non-transitory computer-readable medium of claim 12, further comprising instructions that cause the machine to, when validating the flat file, if finding that metadata of the flat file and the metadata of the associated campaign do not match, abort the publishing process and send an email alert to a system administrator.

* * * * *

UNITED STATES PATENT AND TRADEMARK OFFICE
CERTIFICATE OF CORRECTION

PATENT NO. : 9,454,770 B2
APPLICATION NO. : 14/543661
DATED : September 27, 2016
INVENTOR(S) : Jedediah H. Paulson It is certified that error appears in the above-identified patent and that said Letters Patent is hereby corrected as shown below:

In the Claims

In Column 10, Line 37, in Claim 6, delete "request" and insert --request;--, therefor Signed and Sealed this
Twentieth Day of March, 2018

Andrei Iancu
*Director of the United States Patent and Trademark Office*